(No Model.)
T. T. LUSCOMBE.
WATER FILTER.
No. 513,802. Patented Jan. 30, 1894.
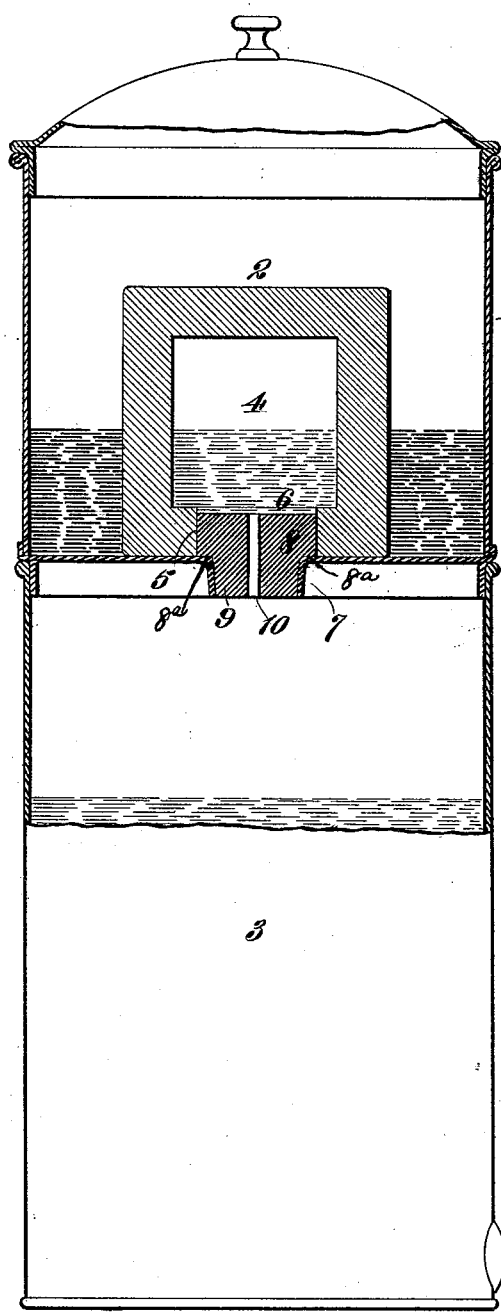
Attest:
Albert M. Ebersole
E. S. Knight
Inventor:
Thos T. Luscombe.
By Knight Bro?
Att'ys
THE NATIONAL LITHOGRAPHING COMPANY,
WASHINGTON, D. C.

UNITED STATES PATENT OFFICE.

THOMAS T. LUSCOMBE, OF CARTHAGE, MISSOURI.

WATER-FILTER.

SPECIFICATION forming part of Letters Patent No. 513,802, dated January 30, 1894.

Application filed February 11, 1893. Serial No. 461,991. (No model.)

*To all whom it may concern:*

Be it known that I, THOMAS T. LUSCOMBE, of Carthage, in the county of Jasper and State of Missouri, have invented a certain new and useful Improvement in Water-Filters, of which the following is a full, clear, and exact description, reference being had to the accompanying drawing, forming part of this specification.

My present invention relates to the class of water filters in which a hollow, tripoli or natural stone block is used, the block being placed in a vessel, placed over a tank which receives the filtered water. In this class of filters much difficulty has been experienced in producing or making a satisfactory plug or cork, which unites the filtering block with the perforated bottom of the vessel, one of the great difficulties being to form a plug or cork, which, when the filtering block is removed to be cleansed, will not break the block when the strain or force to remove the block is applied. Difficulty has also been experienced in the use of plugs or corks which expanded under moisture, and cause the cracking of the block, it being understood that this tripoli or natural stone is soft and easily broken, and great care has to be exercised in handling it.

The object of my invention is to make a cork or plug of one piece which will not expand when moistened, and to so form the cork or plug that when the leverage or strain is applied to the block to remove it from the perforation in the bottom of the vessel, (in which it fits snugly to form a water tight joint,) this strain or leverage will be exerted more on the joint between the plug or cork and the bottom of the vessel, than on the joint between the plug or cork and the block.

To this end my invention consists in features of novelty hereinafter fully described and pointed out in the claims.

The drawing is a vertical section, illustrative of my invention, part of the vessel being shown in elevation.

Referring to the drawing, 1 represents a vessel within which the filtering block 2 is placed. This vessel is adapted to fit over a tank 3, which receives the filtered water. The block 2 is made of tripoli or natural stone, and is formed with a chamber 4, having a large opening 5 at bottom to receive a plug or cork 6. The vessel 1 has an opening or perforation 7, smaller in diameter than the opening 5 of the filtering block. The plug or cork 6 is made of one piece and has a large portion 8 fitting in the opening 5 of the filtering block, and a smaller portion 9 fitting in the opening 7 in the bottom of the vessel 1. The cork or plug is thus provided with a shoulder 8ª which seats on the bottom of the vessel 1, to support the plug or cork while it holds the filtering block in position. The portion 9 of the plug or cork is preferably made tapering, as shown in the drawing, to, in a measure, facilitate the removal of the block. The plug or cork has a perforation extending throughout its length to permit the filtered water to pass into the tank 3. The plug or cork is made of rubber, which will not expand under the moisture and cause the cracking of the block.

The block has to be frequently removed for the purpose of cleansing it, and it is desirable to remove the plug or cork with the block. In removing the block, it is necessary to exert a lateral as well as an upward strain or leverage upon it, so as to loosen the plug or cork in the opening in the bottom of the vessel 1. This strain has often heretofore resulted in the breaking of the block, owing to the fact of there being too much pressure exerted on the joint between the block and the plug, and as much pressure as there is exerted on the joint between the plug and the perforated bottom of the vessel. I diminish these relative pressures by making the portion of the plug which fits within the block larger than the portion of the plug which fits within the perforated bottom of the vessel, so that when pressure or lateral strain is exerted on the filtering block, it will be imparted more to the joint between the plug and the perforated bottom of the vessel than to the joint between the plug and the block, which also results in the plug being removed with the block, instead of being left in the vessel.

I claim as my invention—

1. In a water filter, the combination of a vessel having a perforated bottom, a hollow filtering block of tripoli or natural stone having an opening in its lower end larger than the opening in the bottom of the vessel, and a plug or cork formed in one piece perforated throughout its length and having a large diameter fitting within the perforation or opening in the filtering block, and a smaller diameter fitting within the perforation in the bottom of the vessel, substantially as and for the purpose set forth.

2. In a water filter, the combination of a vessel having a perforated bottom, a hollow filtering block, composed of tripoli or natural stone, and having a large opening in its bottom, and a rubber plug or cork formed in one piece perforated throughout its length and having a large portion fitting within the filtering block, and a smaller, tapering portion fitting in the perforation in the bottom of the vessel, substantially as and for the purpose set forth.

3. A water filter comprising a tank, a vessel, fitting over the tank, having an opening 7, a filtering block 2, formed with a chamber 4 and an opening 5 larger than the opening in the vessel, and the plug or cork 6, formed, in one piece, with a large portion 8 fitting in the opening in the block, a smaller portion 9 fitting in the opening in the vessel, and a perforation extending therethrough; the block being connected with the vessel by means of the plug or cork; substantially as described.

4. A water filter comprising a tank 3, a vessel 1, fitting over the tank, having a tapering opening 7 in the bottom thereof, a filtering block 2, formed with a chamber 4, and an opening 5 larger than the opening in the bottom of the vessel, and the plug or cork 6, formed in one piece, with a large portion 8 fitting in the opening of the block, a shoulder $8^a$ seating on the bottom of the vessel, a small tapering portion 9 fitting in the opening in the bottom of the vessel, and a perforation 10 extending therethrough; the block being held in position and connected with the vessel solely by the plug or cork; substantially as described.

T. T. LUSCOMBE.

In presence of—
JOHN W. HALLIBURTON,
ORVILLE D. ROYCE.